G. S. HULL.
QUICK SETTING MECHANISM.
APPLICATION FILED FEB. 3, 1919.

1,336,839.

Patented Apr. 13, 1920.

Witness
Frank A. Sahle

Inventor
George S. Hull,
Hood Ashby
Attorneys

By

UNITED STATES PATENT OFFICE.

GEORGE S. HULL, OF COLUMBUS, INDIANA.

QUICK-SETTING MECHANISM.

1,336,839.    Specification of Letters Patent.    Patented Apr. 13, 1920.

Application filed February 3, 1919. Serial No. 274,603.

*To all whom it may concern:*

Be it known that I, GEORGE S. HULL, a citizen of the United States, residing at Columbus, in the county of Bartholomew and State of Indiana, have invented a new and useful Quick-Setting Mechanism, of which the following is a specification.

It is the object of my invention to provide for the quick setting and releasing of a vise, jack, press, or similar device, by a simple, compact, and strong construction.

In carrying out my invention, I mount the screw which carries the movable vise jaw or other movable member in a sleeve which is longitudinally slidable in its carrying frame, and provide interlocking mechanism between such frame and sleeve to hold the latter against such longitudinal sliding by the coöperation of tooth surfaces substantially perpendicular to such line of longitudinal sliding; and in the preferred form of my invention I provide these tooth surfaces on the sleeve and on a rotatable collar carried by the supporting frame.

Figure 1:
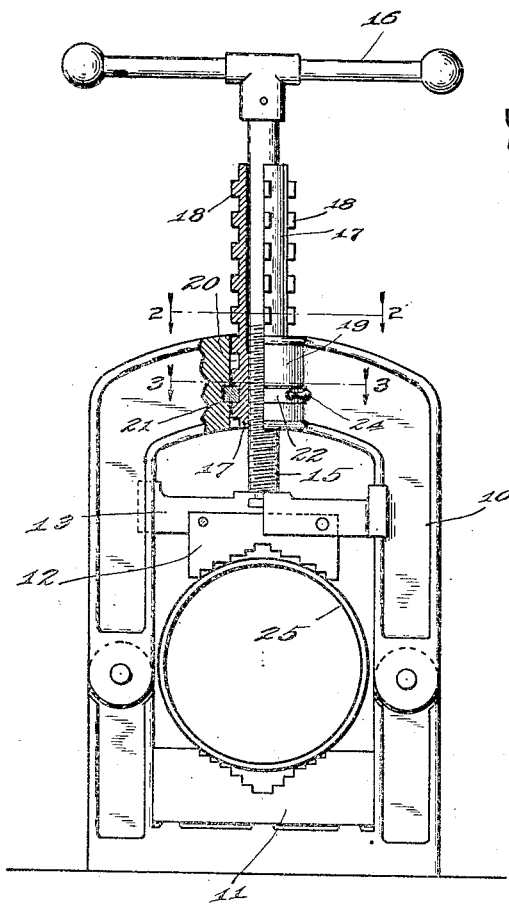
Figure 2:
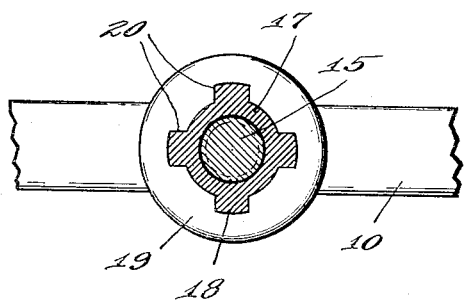
Figure 3:
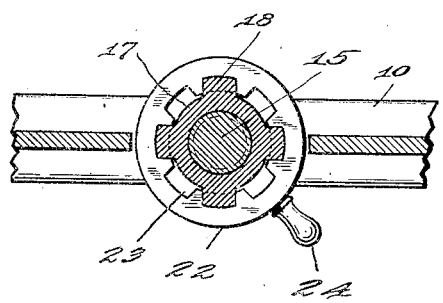

The accompanying drawing illustrates my invention:

Figure 1 is an elevation of a pipe vise embodying my invention, with the frame, sliding sleeve, and rotatable collar in partial section to show their construction; Fig. 2 is a section on the line 2—2 of Fig. 1; and Fig. 3 is a section on the line 3—3 of Fig. 1.

The pipe vise illustrated is merely an example of the devices to which my quick-acting setting and releasing mechanism is applicable. This pipe vise comprises any suitable frame 10, with the usual fixed jaw 11, and movable jaw 12, the latter being carried as usual in a sliding cross arm 13 suitably mounted for sliding in the frame 10.

The cross arm 13 is connected in the usual way to the setting screw 15, which has the usual operating cross arm 16 at the top. This setting screw 15 projects through and has a screw mounting in a sleeve 17, which is conveniently threaded only near its lower end. The sleeve 17 is provided on its outer surface with a plurality of longitudinal rows of teeth 18, four rows being shown. This sleeve 17 is slidably mounted in a fixed annulus 19 forming part of the frame 10. The inner surface of this fixed annulus 19 is provided with a number of longitudinal grooves 20, corresponding in number and in spacing to the rows of teeth 18, and receiving such rows of teeth, so that the sleeve 17 may be slid longitudinally through such annulus but is prevented from turning therein. The annulus 19 also has a cross slot 21, which in the form shown extends through it from inside to outside; and in this cross slot 21 fits a rotatable ring 22. This rotatable ring is provided on its inside surface with a series of notches 23, which correspond in number and spacing to the longitudinal grooves 20 of the fixed annulus 19 and which by the turning of the ring 22 by its operating handle 24 may be moved either into registry with such grooves 20 to permit longitudinal sliding of the sleeve 17 or out of registry therewith so as to interlock with the teeth 18 to prevent such longitudinal sliding. The abutting surfaces of the cross slot 21, the rotatable ring 22, and the teeth 18 are all preferably perpendicular to the common axis of the screw 15 and sleeve 17, so that by the manipulation of the ring 22 no axial movement will be given such sleeve.

In operation, the pipe 25 is placed between the two jaws 11 and 12, and the ring 22 is turned to bring the notches 23 into registry with the grooves 20 to permit the sleeve 17 and screw 15 to be slid longitudinally downward as a unit until the jaw 12 engages the pipe 25. Then the ring 22 is turned to move the notches 23 and grooves 20 out of registry, so that the inwardly projecting teeth formed in the ring 22 between the notches 23 will interlock with the teeth 18; to produce this turning of the ring 22, a slight turning of the screw 15 by its operating cross arm 16 may first be necessary to raise or lower the sleeve 17 slightly. After this interlocking between the ring 22 and the teeth 18 is obtained, the cross arm 16 is operated to force the screw 15 downward within the sleeve 17 so as to produce the desired clamping of the pipe 25 between the vise jaws 11 and 12. Thus the setting operation may be accomplished very quickly, with only a very slight screw movement. To release the pipe 25 from the vise jaws, the reverse operation is performed. The cross arm 16 is turned to elevate the screw 15 in the sleeve 17 until the pressure on the parts is relieved, then the ring 22 is rotated to bring the notches 23 into registry with the grooves 20, and then the sleeve 17 and screw 15 are slid upwardly as a unit to permit the pipe 25 to be removed, the sleeve 17 being held in its uppermost position, if desired, by again turning the ring 22 so that it interlocks with the teeth 18.

I claim as my invention:

1. In a quick-setting mechanism, the combination of a screw, a sleeve in which said screw is mounted, said sleeve being provided with a longitudinal row of teeth on its outer surface, a frame having a hole in which said sleeve is axially slidable, and an internally slotted ring mounted in said frame around said sleeve and rotatable to move the slot on its inner surface into or out of registry with said row of teeth.

2. In a quick-setting mechanism, the combination of a screw, a sleeve in which said screw is mounted, said sleeve being provided with a longitudinal row of teeth on its outer surface, a frame having a hole in which said sleeve is axially slidable, said hole having a longitudinal slot which receives said row of teeth, and an internally slotted ring mounted in said frame around said sleeve and rotatable to move the slot on its inner surface into or out of registry with said row of teeth.

3. In a quick-setting mechanism, the combination of a screw, a sleeve in which said screw is mounted, said sleeve being provided with a row of teeth on its outer surface, a frame having a hole in which said sleeve is axially slidable, and an internally slotted ring mounted in said frame around said sleeve and rotatable to move the slot on its inner surface into or out of registry with said row of teeth.

4. In a quick-setting mechanism, the combination of a screw, a sleeve in which said screw is mounted, said sleeve being provided with a row of teeth on its outer surface, a frame having a hole in which said sleeve is axially slidable, said hole having a slot which receives said row of teeth, and an internally slotted ring mounted in said frame around said sleeve and rotatable to move the slot on its inner surface into or out of registry with said row of teeth.

5. In a quick-setting mechanism, the combination of a screw, a sleeve in which said screw is mounted, said sleeve being provided with a longitudinal row of teeth on its outer surface, a frame having a hole in which said sleeve is axially slidable, and an internally slotted ring mounted in said frame around said sleeve and rotatable to move the slot on its inner surface into or out of registry with said row of teeth, the abutting surfaces of said frame with said ring and of said ring with said teeth when the slot in the ring is out of registry with the teeth being substantially perpendicular to the axis of the sleeve.

6. In a quick-setting mechanism, the combination of a screw, a sleeve in which said screw is mounted, said sleeve being provided with a row of teeth on its outer surface, a frame having a hole in which said sleeve is axially slidable, and an internally slotted ring mounted in said frame around said sleeve and rotatable to move the slot on its inner surface into or out of registry with said row of teeth, the abutting surfaces of said frame with said ring and of said ring with said teeth when the slot in the ring is out of registry with the teeth being substantially perpendicular to the axis of the sleeve.

7. In a quick-setting mechanism, the combination of a screw, a sleeve in which said screw is mounted, said sleeve being provided with a longitudinal row of teeth on its outer surface, a member having a hole in which said sleeve is axially slidable, said member having a longitudinal slot which receives said row of teeth, said sleeve and said member being relatively rotatable so as to move the slot in said member into or out of registry with said teeth, and said teeth and said member when said slot is out of registry with the teeth engaging on surfaces substantially perpendicular to the axis of the sleeve.

8. In a quick-setting mechanism, the combination of a screw, a sleeve in which said screw is mounted, said sleeve being provided with a row of teeth on its outer surface, a member having a hole in which said sleeve is axially slidable, said member having a slot which receives said row of teeth, said sleeve and said member being relatively rotatable so as to move the slot in said member into or out of registry with said teeth, and said teeth and said member when said slot is out of registry with the teeth engaging on surfaces substantially perpendicular to the axis of the sleeve.

In witness whereof, I have hereunto set my hand at Indianapolis, Indiana, this 31st day of January, A. D. one thousand nine hundred and nineteen.

GEORGE S. HULL.